(12) United States Patent
Kanai

(10) Patent No.: US 6,675,768 B2
(45) Date of Patent: Jan. 13, 2004

(54) CONTROL SYSTEM FOR INTERNAL COMBUSTION ENGINE AND METHOD

(75) Inventor: Hiroshi Kanai, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/119,694

(22) Filed: Apr. 11, 2002

(65) Prior Publication Data

US 2002/0174850 A1 Nov. 28, 2002

(30) Foreign Application Priority Data

Apr. 23, 2001 (JP) ........................................ 2001-124579

(51) Int. Cl.[7] ................................................ F02D 9/00
(52) U.S. Cl. ..................... 123/336; 123/399; 123/90.15; 123/406.23; 123/436
(58) Field of Search ................................. 123/336, 399, 123/90.15, 406.23, 436, 442, 198 D; 73/118.2

(56) References Cited

U.S. PATENT DOCUMENTS

| | | | | |
|---|---|---|---|---|
| 4,955,448 A | * | 9/1990 | Ise et al. | 180/197 |
| 5,408,969 A | * | 4/1995 | Obaraki et al. | 123/336 |
| 5,542,388 A | * | 8/1996 | Ichinose et al. | 123/336 |
| 6,283,088 B1 | * | 9/2001 | Takagi et al. | 123/295 |
| 6,497,212 B2 | * | 12/2002 | Matsumoto et al. | 123/295 |

FOREIGN PATENT DOCUMENTS

| | | | | |
|---|---|---|---|---|
| JP | 131837 | * | 8/1982 | F02D/9/02 |
| JP | 43642 | * | 2/1991 | F02D/9/02 |
| JP | A 5-39743 | | 2/1993 | |
| JP | A 7-83101 | | 3/1995 | |
| JP | A 9-14017 | | 1/1997 | |
| JP | A 2000-73843 | | 3/2000 | |

* cited by examiner

Primary Examiner—Henry C. Yuen
Assistant Examiner—Hai Huynh
(74) Attorney, Agent, or Firm—Oliff & Berridge, PLC

(57) ABSTRACT

A system and method for controlling an internal combustion engine with an intake air flow control valve provided downstream of a throttle valve within an intake passage of the internal combustion engine includes controlling an opening amount of the intake air flow valve of the internal combustion engine to adjust the intake air quantity when the intake air quantity cannot be controlled by the throttle valve.

16 Claims, 3 Drawing Sheets

CONTROL SYSTEM FOR INTERNAL COMBUSTION ENGINE AND METHOD

INCORPORATION BY REFERENCE

The disclosure of Japanese Patent Application No. 2001-124579 filed on Apr. 23, 2001, including the specification, drawing and abstract is incorporated herein by reference in its entirety.

BACKGROUND OF THE INVENTION

1. Field of Invention

The invention relates to a control system for an internal combustion engine, and more particularly to an air intake control system having an intake air flow control valve disposed downstream of a throttle valve.

2. Description of Related Art

Japanese Patent Laid-Open No. 7-83101 or Japanese Patent Laid-Open No. 2000-73843 discloses an air intake control system for an internal combustion engine. In the aforementioned control system, an intake air flow control valve disposed downstream of a throttle valve within an intake air passage is closed upon cold starting for raising the negative pressure in the intake air passage to enhance volatility of the injected fuel using a boiling effect under reduced pressure, and to generate a tumble flow in a cylinder, thus improving a combustion in the cylinder.

Recently further improvement in fail-safe performance has been required, and various arts have been developed to cope with the demand. The aforementioned related arts respectively disclose fail-safe technologies against a failure in the intake air flow control valve, but disclose no fail-safe technologies against a failure in the throttle valve or a damage to an intake system.

SUMMARY OF THE INVENTION

The invention thus provides a control system for an internal combustion engine having a fail-safe function against a failure in the throttle valve or damage to the air inlet system.

According to an aspect of the invention, a control system for an internal combustion engine is provided with a throttle valve provided within an intake passage of the internal combustion engine and controlling an intake air quantity, an intake air flow control valve that is provided downstream of the throttle valve within the intake passage, and a controller that controls the intake air flow control valve to be opened and closed in accordance with an operation state of the internal combustion engine. The controller controls an intake air quantity by adjusting an opening amount of the intake air flow control valve when it is determined that the intake air quantity cannot be controlled by the throttle valve.

Unlike the throttle valve, the intake air flow control valve has a vent hole and, therefore, is not expected to have a function of adjusting the intake air quantity. However a rough adjustment of the intake air quantity can be made by adjusting an opening amount of the intake air flow control valve, though such adjustment is not performed as accurately as being performed by the throttle valve. Thus, it is possible to realize a fail-safe function that allows a safe limp-home running by adjusting the intake air quantity using the intake air flow control valve upon an unexpected abnormal state of the engine such as a failure in the throttle valve or the damage to the intake system.

Further, it is preferable that a torque of the internal combustion engine be controlled parallel with the air quantity control. As described above, the intake air flow control valve is not expected to have the function of adjusting the intake air quantity, and the range for adjusting the intake air quantity is thus limited. A fine adjustment of the torque by correcting at least one of the ignition timing, fuel injection amount, and variable valve timing prevents an increase in emissions and allows stable limp-home running.

BRIEF DESCRIPTION OF THE DRAWINGS

The foregoing and further objects, features and advantages of the invention will become apparent from the following description of preferred exemplary embodiments with reference to the accompanying drawings, wherein like numerals are used to represent like elements and wherein.

DETAILED DESCRIPTION OF PREFERRED EMBODIMENTS

Figure 1:
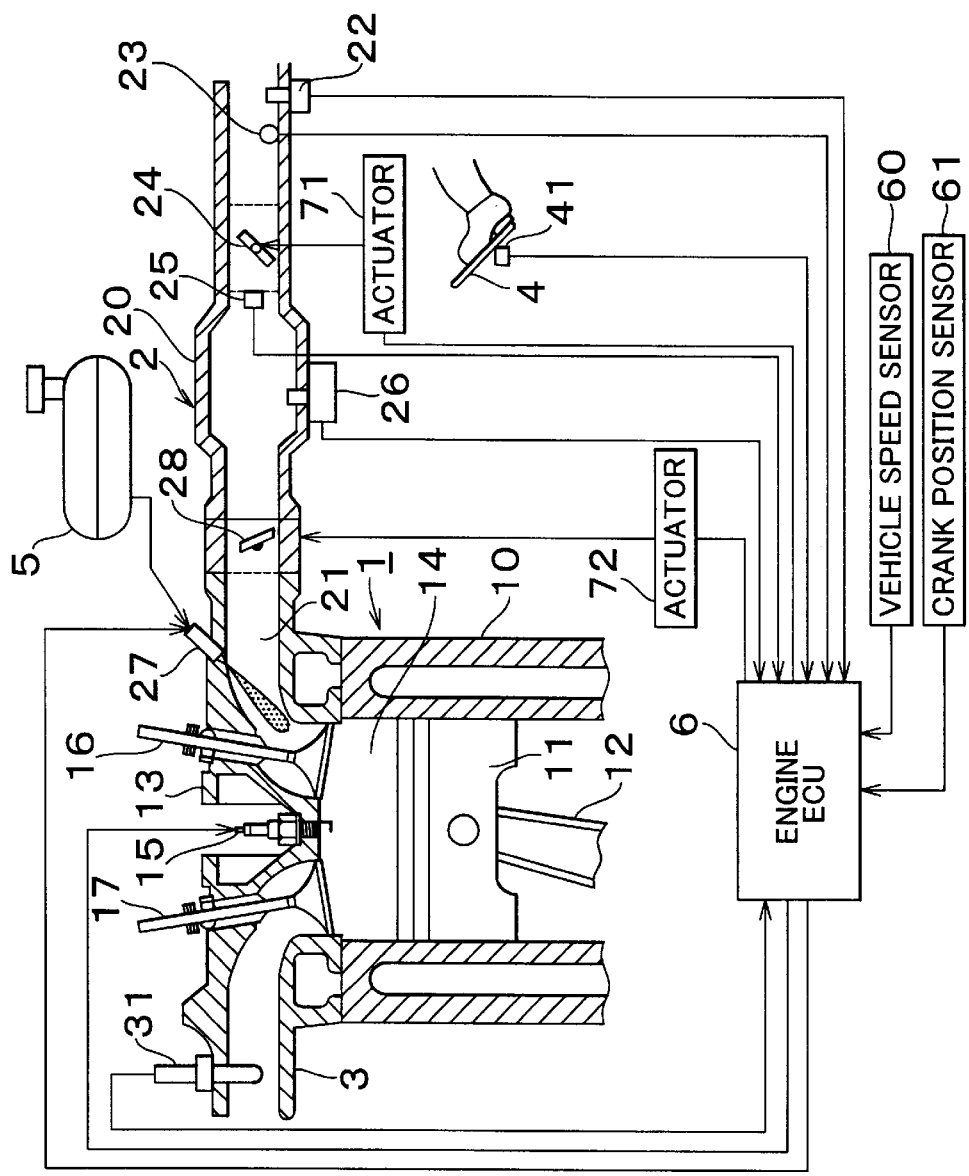
FIG. 1 is a schematic structural view of an internal combustion engine provided with an air intake control system for an internal combustion engine according to the invention.

Hereinafter a detail explanation will be given for a preferred exemplary embodiment of the invention with reference to the attached drawings. In those drawings, the same reference numerals will be used for the same elements such that the same description of those elements may be omitted.

FIG. 1 is a schematic view of an internal combustion engine in which an intake air control system according to an exemplary embodiment of the invention is employed.

Referring to FIG. 1, an intake pipe 2 and an exhaust pipe 3 are connected to a spark-ignition type multi-cylinder internal combustion engine 1 (in this case, gasoline engine, and hereinafter referred to as an "internal combustion engine"). Provided within the intake pipe 2 are an intake air temperature sensor 22 which detects a temperature of the intake air, an airflow meter 23 which detects intake air quantity, a throttle valve 24, and a throttle opening sensor 25 which detects an opening amount of the throttle valve 24. The throttle valve 24 is connected to an actuator 71, actuation of which is controlled by an engine ECU 6 to be described later in accordance with a position of an accelerator pedal 4 (detected by an accelerator pedal position sensor 41) and the vehicle speed.

Also an intake air pressure sensor 26 for detecting pressure in the intake pipe 2 is disposed in a surge tank 20 of the intake pipe 2. Further, an electromagnetic injector (fuel injection device) 27 is disposed in an intake port 21 connected to each cylinder of the internal combustion engine 1. Gasoline as a fuel is supplied to the injector 27 from a fuel tank 5. An injection system of the internal combustion engine 1 shown in FIG. 1 is a multi-point injection system provided with the injector 27 for each cylinder.

An intake air flow control valve 28 is disposed between the surge tank 20 and the intake port 21. In FIG. 1, the intake air flow control valve 28 is closed to block a part of the intake pipe 2 such that the cross sectional area of the intake pipe 2 is reduced. Further, an actuator 72 is connected to the intake air flow control valve 28 for opening/closing the intake air flow control valve 28.

Provided within a cylinder 10 which constitutes the cylinder of the internal combustion engine 1 is a piston 11 that reciprocates in a vertical direction in the drawing. The piston 11 is connected to a crank shaft (not shown) via a connecting rod 12. A combustion chamber 14 is defined by the cylinder 10 and a cylinder head 13 above the piston 11. A spark plug 15 is provided upward of the combustion chamber 14 that is connected to the intake pipe 2 and the exhaust pipe 3 via an intake valve 16 and an exhaust valve 17 respectively, which can be opened and closed.

Provided in the exhaust pipe 3 is an air-fuel ratio sensor 31 which outputs an electric signal corresponding to an oxygen concentration in exhaust gas.

The engine ECU 6 (including a control section of the intake control device in the internal combustion engine according to the exemplary embodiment of the invention) for controlling the internal combustion engine 1 is mainly constructed by a microcomputer. The engine ECU 6 receives signals sent from the various sensors such as an intake air temperature sensor 22, an airflow meter 23, a throttle opening sensor 25, an intake air pressure sensor 26, an air-fuel ratio sensor 31, and an accelerator pedal position sensor 41, a vehicle speed sensor 60, and a crank position sensor 61, and controls the spark plug 15, the injector 27 and the actuators 71, 72.

Figure 2:
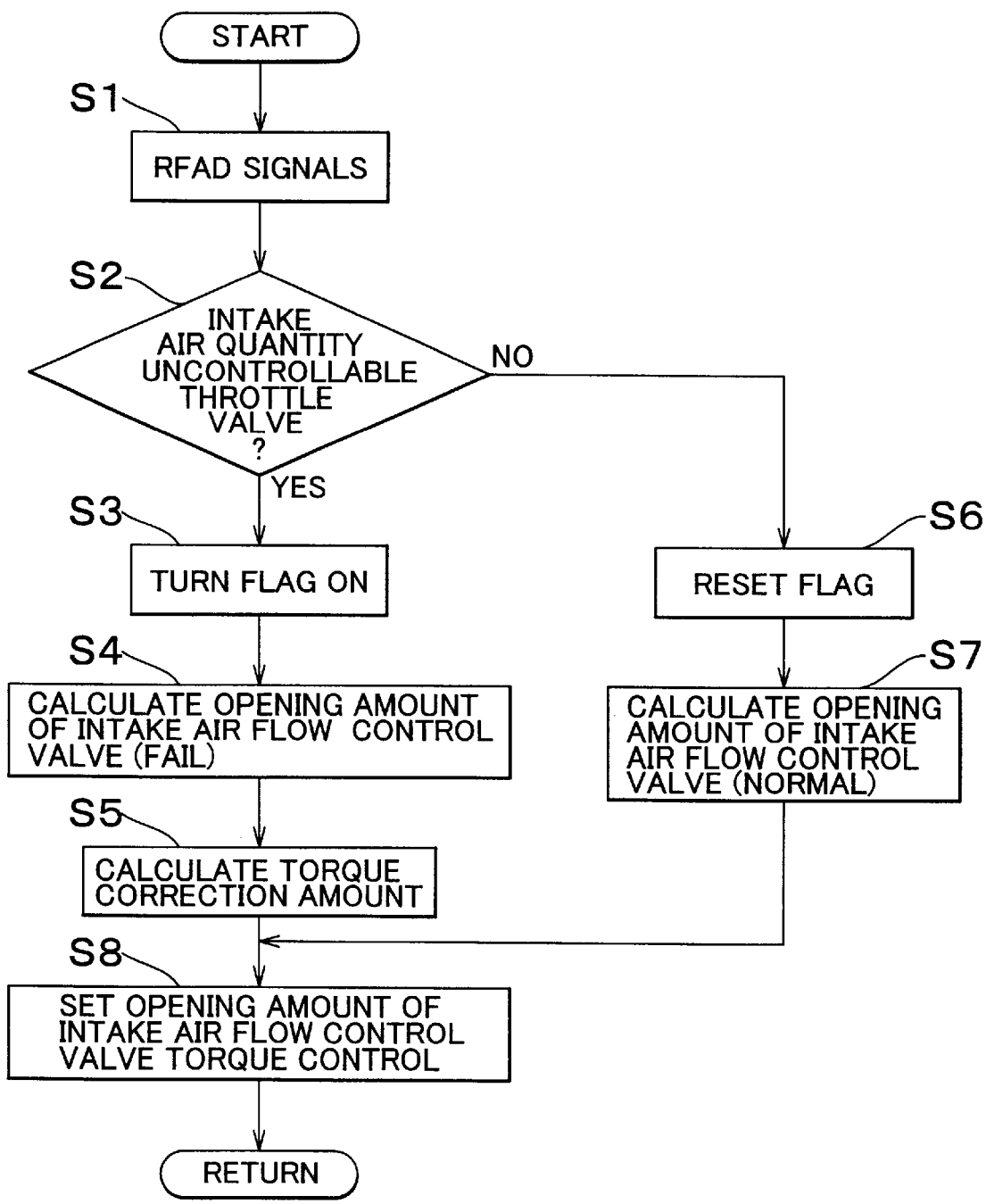
FIG. 2 is a flowchart showing an air intake control routine executed in the air intake control system for the internal combustion engine as shown in FIG. 1.

Next, operation of the air intake control system for the internal combustion engine will be described. FIG. 2 is a flowchart representing a control routine executed in the air intake control system. The control is repeatedly executed by the engine ECU 6 at predetermined time intervals when an ignition key is turned on.

In step S1, signals indicating the state of the operation of the air intake system are read. Those signals are sent from the intake air temperature sensor 22, the airflow meter 23, the throttle opening sensor 25, the intake air pressure sensor 26, the air-fuel ratio sensor 31, the accelerator pedal position sensor 41, the vehicle speed sensor 60, and the crank position sensor 61.

Then in step S2, it is determined whether the intake air quantity control is normally executed by the throttle valve 25. More specifically, when a difference between an actual opening amount of the throttle valve 24 derived from the signal sent from the throttle opening sensor 25 and a target opening amount calculated by the engine ECU 6 is large, it is determined that the opening amount of the throttle valve 24 is not able to be controlled owing to an immovable state of the throttle valve 24, for example. When an actual intake air quantity obtained based on the signal sent from the airflow meter 23 is unnecessarily greater than the intake air quantity to be obtained based on the opening amount of the throttle valve 24, it is determined that the intake air quantity control is not normally executed because a damage to the intake pipe 2 may occur downstream of the throttle valve 24.

If YES is obtained, that is, it is determined that the intake air quantity control is not normally executed in step S2, the process proceeds to step S3. In step S3, a flag indicating the uncontrollable state is set, and the process proceeds to step S4.

Figure 3:
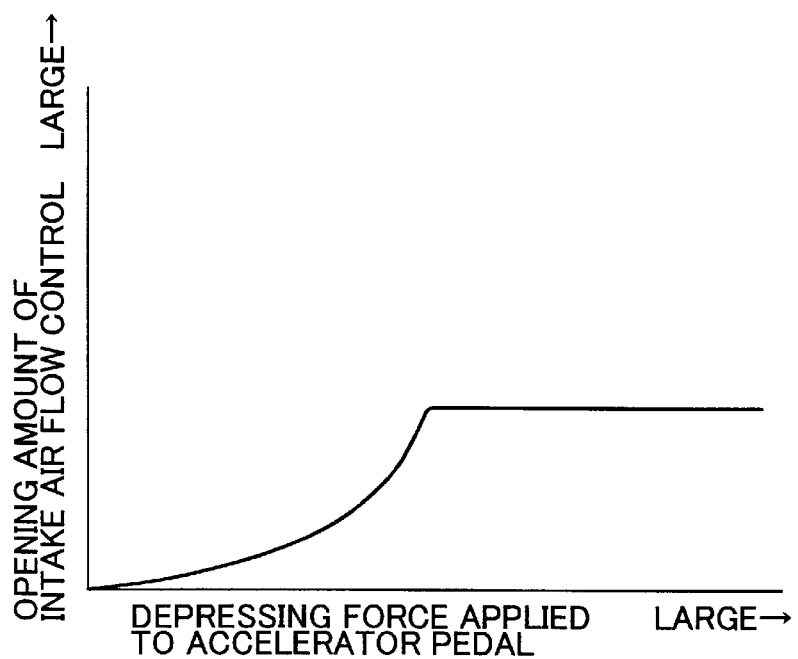
FIG. 3 is a graph representing a relationship between an opening degree of the accelerator-pedal and the opening degree of the intake air flow control valve upon occurrence of a failure.

In step S4, an opening amount of the intake air flow control valve 28 at a time when failure occurs is calculated. This opening amount is set in accordance with the accelerator pedal position detected by the accelerator pedal position sensor 41 to obtain required quantity of the intake air. FIG. 3 is a graph that represents an example of the opening amount of the intake air flow control valve 28, which is set in accordance with the accelerator pedal position derived from the accelerator pedal position sensor 41. Referring to FIG. 3, the aforementioned control is executed upon failure in the intake system. Thus, the opening amount of the intake air flow control valve 28 is controlled to a predetermined value and not controlled to a full open state when the accelerator pedal position 2 that is, the depressing force applied to the accelerator pedal, is kept at a predetermined level or greater.

Figure 4:
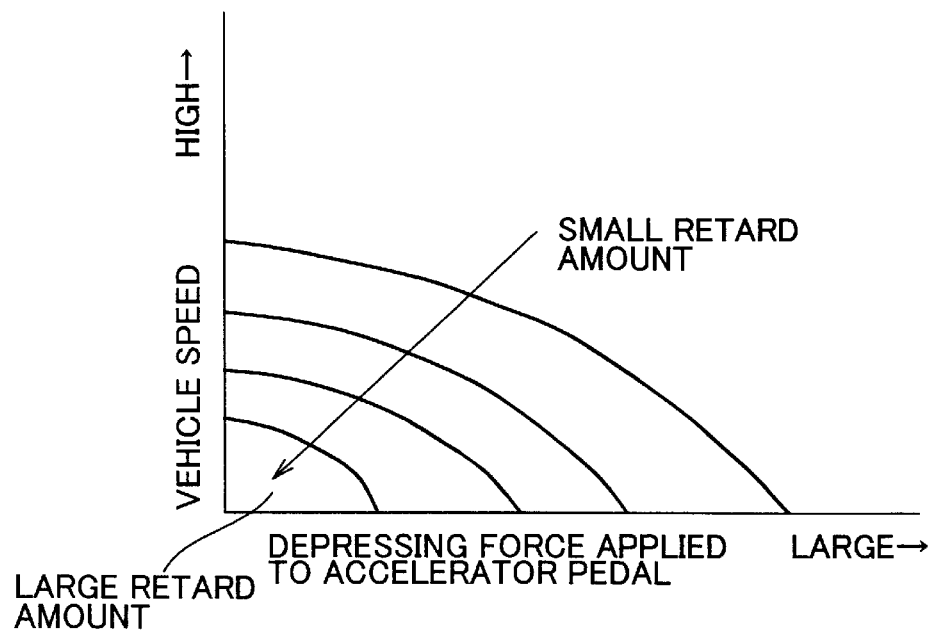
FIG. 4 is a map showing an ignition retard control amount defined by the opening degree of the accelerator and the vehicle speed.

In step S5, a torque correction amount is calculated. Even in a full closed state, the air flow control valve 28 allows a greater quantity of the intake air to pass therethrough than the quantity of the intake air to pass through the throttle valve 24 in the full closing state. Therefore, engine speed increases in a low-speed region and, thus, a higher torque is generated. Hence, the torque is corrected such that the generated torque is reduced as the depressing force applied to the accelerator pedal decreases and the vehicle speed decreases. More specifically, for example, an amount by which the spark ignition timing of the spark plug 15 is retarded is set to be increased as the depressing force applied to the accelerator pedal decreases and the vehicle speed decreases using a torque correction map as shown in FIG. 4 in the engine ECU 6.

Next, in step S8, the actuator 72 and the spark plug 15 are controlled in accordance with the calculated opening amount of the intake air flow control valve 28 and the torque correction amount (retard amount of the ignition timing) to obtain the torque in accordance with the accelerator pedal position and the vehicle speed. The intake air flow control valve 28 is controlled so as not to be fully opened. Therefore, the intake air quantity is limited, and therefore, the maximum torque is limited. However, the resultant output is sufficient to allow the safe and stable limp-home running.

If NO is obtained in step S2, that is, it is determined that the intake quantity control can be normally executed using the throttle valve 24, the process proceeds to step S6. In step S6, the flag indicating the uncontrollable state is reset, and then the process proceeds to step S7. In step S7, the opening of the intake air flow control valve 28 in a normal condition is calculated and, in step S8, the opening of the intake air flow control valve 28 is set at the calculated opening amount by the actuator 72. Upon cold starting, the intake air flow control valve 28 is closed to localize the downstream airflow in the intake pipe 2. As a result, atomization of the fuel and generation of turbulence within the combustion chamber 14 may be promoted owing to the boiling effect under reduced pressure, thus improving combustion. When the combustion improvement is not required, the intake air flow control valve 28 is opened.

In the exemplary embodiment described above, the torque is controlled by correcting the retard amount of the ignition timing. However, it is possible to control the torque by correcting the fuel injection amount or advance amount of a variable valve-timing mechanism. In the former case, the torque can be reduced by decreasing the fuel injection amount. In the latter case, the torque can be reduced by decreasing the advance amount of the variable valve-timing mechanism.

As described above, in the exemplary embodiment of the invention, the intake air quantity may be controlled by adjusting the opening of the intake air flow control valve even when the failure occurs in the throttle valve 24, preventing the intake air quantity controlling. Accordingly, the fail-safe performance can be improved.

Further, unnecessarily excessive torque generation may be prevented within a low vehicle speed range by adjusting the torque, which is performed by correcting at least one of the retard amount of the ignition timing, the fuel injection amount, and the variable valve-timing.

The engine ECU 6 of the illustrated embodiment is implemented as one or more programmed general purpose computers. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hard-wired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A control system for an internal combustion engine, comprising:
    a throttle valve provided within an intake passage of the internal combustion engine and controlling an intake air quantity;
    an intake air flow control valve provided downstream of the throttle valve within the intake passage, wherein the intake air quantity flowing through the intake air flow control valve when the intake air flow control valve is fully closed is more than the intake air quantity when the throttle valve is fully closed; and
    a controller controlling the intake air flow control valve to be opened and closed in accordance with an operation state of the internal combustion engine, wherein the intake air quantity is controlled by adjusting an opening amount of the intake air flow control valve when it is determined that the intake air quantity cannot be controlled by the throttle valve.

2. The control system according to claim 1, wherein the controller adjusts a torque generated in the internal combustion engine along with the control of the intake air quantity when the controller determines that the intake air quantity cannot be controlled by the throttle valve.

3. The control system according to claim 2, wherein the controller controls the torque generated in the internal combustion engine by correcting at least one of a spark ignition timing, a fuel injection amount, and a variable valve timing.

4. The control system according to claim 3, wherein the controller reduces the torque generated in the internal combustion engine by increasing an amount by which the spark ignition timing is retarded.

5. The control system according to claim 3, wherein the controller reduces the torque generated in the internal combustion engine by decreasing the fuel injection amount.

6. The control system according to claim 3, wherein the controller reduces the torque generated in the internal combustion engine by decreasing an advance amount of the variable valve timing.

7. The control system according to claim 2, wherein the controller adjusts the torque so that the torque generated in the internal combustion engine is reduced.

8. The control system according to claim 1, wherein the internal combustion engine includes a plurality of cylinders and the intake air flow control valve is provided with each of the cylinders.

9. A control method for an internal combustion engine including an intake air flow control valve that is provided downstream of a throttle valve within an intake passage of the internal combustion engine, wherein an intake air Quantity flowing through the intake air flow control valve when the intake air flow control valve is fully closed is more than the intake air quantity when the throttle valve is fully closed, comprising:
    controlling the intake air flow control valve to be opened and closed in accordance with an operation state of the internal combustion engine; and
    controlling an intake air quantity by adjusting an opening amount of the intake air flow control valve when the intake air quantity cannot be controlled by the throttle valve.

10. The control method according to claim 9, wherein a torque generated in the internal combustion engine is adjusted along with the control of the intake air quantity when the intake air quantity cannot be controlled by the throttle valve.

11. The control method according to claim 10, wherein the torque generated in the internal combustion engine is controlled by correcting at least one of a spark ignition timing, a fuel injection amount, and a variable valve timing.

12. The control method according to claim 11, wherein the torque generated in the internal combustion engine is reduced by increasing an amount by which the spark ignition timing is retarded.

13. The control method according to claim 11, wherein the torque generated in the internal combustion engine is reduced by decreasing the fuel injection amount.

14. The control method according to claim 11, wherein the torque generated in the internal combustion engine is reduced by decreasing an advance amount of the variable valve timing.

15. The control method according to claim 10, wherein the torque is adjusted so that the torque generated in the internal combustion engine is reduced.

16. The control method according to claim 9, wherein the internal combustion engine includes a plurality of cylinders and the intake air flow control valve is provided with each of the cylinders.

* * * * *